United States Patent [19]
Rockenfeller et al.

[11] Patent Number: 5,291,753
[45] Date of Patent: Mar. 8, 1994

[54] CONTINUOUS CONSTANT PRESSURE SYSTEM FOR STAGING SOLID-VAPOR COMPOUNDS

[75] Inventors: Uwe Rockenfeller; Lance D. Kirol, both of Boulder City, Nev.

[73] Assignee: Rocky Research, Boulder City, Nev.

[21] Appl. No.: 68,691

[22] Filed: May 27, 1993

Related U.S. Application Data

[60] Division of Ser. No. 716,065, Jun. 17, 1991, Pat. No. 5,241,831, which is a continuation-in-part of Ser. No. 436,431, Nov. 14, 1989, Pat. No. 5,025,635.

[51] Int. Cl.$^5$ ............................................. F25B 17/08
[52] U.S. Cl. ..................................... 62/480; 62/324.1; 62/106
[58] Field of Search ................. 62/106, 114, 101, 102, 62/467, 476, 478, 480, 112, 324.1, 324.2; 165/104.12

[56] References Cited

U.S. PATENT DOCUMENTS

2,496,459  9/1950  Kleen ..................... 62/480
4,610,148  9/1986  Shelton ................... 62/480

Primary Examiner—John M. Sollecito
Attorney, Agent, or Firm—Jerry R. Seiler

[57] ABSTRACT

An improved apparatus for staging solid-vapor complex compounds comprises heat exchange means for transferring heat from super-heated refrigerant vapor from a desorbing reactor to cooled refrigerant vapor directed to an adsorbing reactor. In another embodiment a liquid subcooler is used to cool liquid refrigerant passing from a condenser to an evaporator with cold refrigerant gas directed to an adsorbing reactor from the evaporator.

8 Claims, 4 Drawing Sheets

CONTINUOUS CONSTANT PRESSURE SYSTEM FOR STAGING SOLID-VAPOR COMPOUNDS

This application is a divisional of application Ser. No. 07/716,065, filed Jun. 17, 1991, now U.S. Pat. No. 5,241,831, which is a continuation-in-part of co-pending application Ser. No. 07/436,431 filed Nov. 14, 1989, now U.S. Pat. No. 5,025,831.

BACKGROUND OF THE INVENTION

In the aforesaid-application there are described apparatus and methods for staging sold-vapor compounds, the descriptions of which are incorporated herein by reference.

The use of compounds comprising solid-vapor compositions formed by adsorption, sometimes referred to as absorption, of gas molecules on a solid adsorbent as heat pump working materials is known in the art. Heat pump systems using such materials have a number of advantages over other heat pumps for residential and commercial space conditioning, industrial heat pumping and refrigeration. Such advantages include higher temperature lift created by the solid-vapor media as compared to other sorption media thus eliminating the need for cooling towers or lift staging. Moreover, the apparatus used for the solid-vapor compound heat pumps require few, if any, moving parts, resulting in simple and reliable hardware. Additionally, such systems do not use the objectionable CFC'S.

The solid-vapor compounds suitable for heat pumps include complex compounds which are materials which adsorb molecules of gas to form coordinative bonds in which the gaseous reactant coordinates via electron displacement with the solid adsorbent, commonly a solid metal inorganic salt. The adsorption/desorption process releases significant heat during adsorption and adsorbs energy during the desorption phase. Unlike most other sorption processes, the entire adsorption or desorption reactions may occur at constant temperature thus eliminating problems with hot and cold sorber ends. Useful gaseous reactants include water, ammonia, methanol, methane, ethane and the like. A number of such materials are described in U.S. Pat. Nos. 4,822,391 and 4,848,944. Such compounds and their uses described in the aforesaid patents are incorporated herein by reference.

Heat activated heat pumps consist of a heat engine subsystem which generates high pressure refrigerant vapor, essentially a thermal compressor, and a heat pump subsystem which uses high pressure refrigerant to produce cooling or heat pumping. The thermal compressor, heat pump, and their combination in a heat activated heat pump comprise useful thermodynamic systems which make advantageous use of solid-gas reactions. In the aforesaid application there are described apparatus and methods using continuous constant pressure staging techniques resulting in improved heat activated heat pump systems. It is an object of the present invention to use such reactions and staging techniques to even greater advantage and efficiency.

SUMMARY OF THE INVENTION

In the present invention, there are provided apparatus improvements used in the heat activated heat pump described in the aforesaid co-pending application. These improvements include a vapor recuperator and a liquid subcooler, may be used individually, or in combination. The vapor recuperator is used with a system incorporating a refrigerant condenser and evaporator, or absorber/desorber receivers for gaseous reactant directed to and from the reactors. The liquid subcooler is used only in a refrigerant phase change (condenser/evaporator) system. In another embodiment, multiple-circuits for directing different heat transfer fluids through the reactors are disclosed. In yet another embodiment, preferred reactant media comprise the use of one or more specific complex compounds in the set or plurality of compounds in the different reactors. These preferred complex compounds are disclosed.

DETAILED DESCRIPTION

Heat Activated Heat Pump

Figure 1:
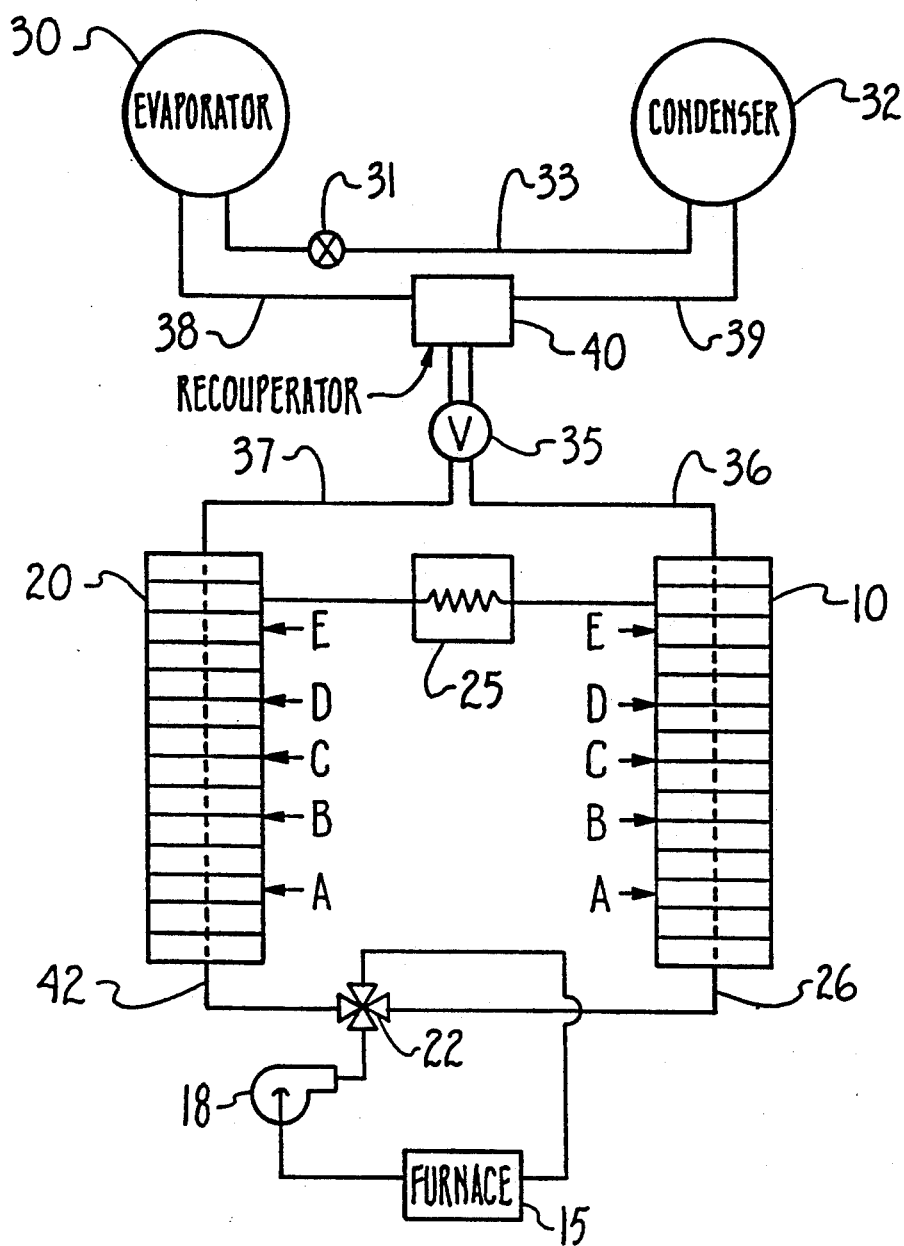
FIGS. 1 and 2 are schematic illustrations of an apparatus of the invention incorporating a vapor recuperator.

As used herein, the term "compound" is intended to mean any reaction product formed by adsorption and desorption, i.e. chemisorption, of a gaseous reactant on a solid reactant within the scope of the invention. In practicing the continuous staging of a constant pressure engine cycle according to the invention, a plurality of two or more different solid reactants are selected, and a plurality or set of different solid reactants is introduced into each reactor in the heat pump apparatus. Each of the compounds of such sets or groups each exhibit different vapor pressure curves, i.e., each has a different vapor pressure-temperature relationship, and which is independent of the concentration of the gaseous reactant. Thus, each of the compounds in a set in a reactor adsorb and desorb the same gaseous reactant at a different temperature at the reaction pressure in the reactor. Compounds are selected and arranged in the reactor in sequence of ascending order of gas vapor pressure. Preferably the compounds of the series are selected so that none of the compounds in the same reactor have an additional coordination step at lower equilibrium temperature which may adsorb more reactant gas from the other compounds during temperature equilibrium or shut-down condition which would reduce cycle performance during intermittent operation. Moreover, masses of each compound are adjusted so that the amount of heat required to desorb each compound is related to the temperature difference between that compound and the next higher temperature compound.

The compounds are arranged in the reactors in sequence based on the compound gaseous vapor pressure, and preferably are arranged successively in ascending order of gas vapor pressure. The reactors are provided with means for directing a heat transfer fluid to thermally communicate with the compounds. During process operation the heat transfer fluid is gradually cooled as it passes through a desorbing reactor in which the successive compounds desorb the gaseous reactant at successively lower temperatures. In the adsorbing reactor, the fluid will become gradually heated as it is successively exposed thermally to the succession of adsorbing compounds in which next successive compound in the sequence adsorbs at a higher temperature.

Specific reactants used to form compounds useful in the invention include metal oxides, halide, carbonates, nitrites, nitrates, oxalates, sulfides and sulfates. Preferred metals for the inorganic salts are selected from alkali and alkaline earth metals, transition metals, aluminum, zinc, cadmium and tin. Preferred transition metals are manganese, iron, nickel, and cobalt. Hereinafter these reactants will be sometimes referred to as solids, salts or solid reactants.

Gaseous reactants which are adsorbed on the solids to form compounds which are especially useful in the processes of the invention are ammonia, water, methylamine and reethanol, ammonia being especially suitable because it is stable, and forms high energy complexes. However, sulfur dioxide, other lower alkanols, lower alkanes, particularly methane and ethane, pyridine, alkylamines, polyamines and phosphine may also be used as may carbon dioxide with metal oxides. These gaseous reactants may also be referred to as refrigerants herein. Particularly preferred systems incorporate a set or series of ammoniated complex compounds which include one or more of the following:

Ba $Cl_2 \cdot 0$-8 $(NH_3)$, Sr $Cl_2 \cdot 1$-8 $(NH_3)$, Sr $Br_2 \cdot 2$-8 $(NH_3)$,
Ca $Cl_2 \cdot 0$-1 $(NH_3)$, Ca $Cl_2 \cdot 1$-2 $(NH_3)$, Ca $Cl_2 \cdot 2$-2 $(NH_3)$,
Ca $Cl_2 \cdot 4$-8 $(NH_3)$, Ca $Br_2 \cdot 2$-6 $(NH_3)$, Ni $Cl_2 \cdot 2$-6 $(NH_3)$,
Fe $Cl_2 \cdot 2$-6 $(NH_3)$, Fe $Br_2 \cdot 2$-6 $(NH_3)$,
Co $Cl_2 \cdot 2$-6 $(NH_3)$, Co $Br_2 \cdot 2$-6 $(NH_3)$,
Mg $Cl_2 \cdot 2$-6 $(NH_3)$, Mg $Br_2 \cdot 2$-6 $(NH_3)$,
Mn $Cl_2 \cdot 2$-6 $(NH_3)$, Mn $Br_2 \cdot 2$-6 $(NH_3)$,
Cu $SO_2 \cdot 2$-5 $(NH_3)$, Zn $Cl_2 \cdot 1$-4 $(NH_3)$, and
Na $BF_4 \cdot 0.5$-2.5 $(NH_3)$.

Although in the aforesaid complex compounds, numerical value of moles of ammonia per mole of salt is given, in some complexes, the mole range given comprises several coordination steps. Thus, for example, in the case of the Cu $SO_4$, Zn $Cl_2$ and particularly Na $BF_4$, a number of different reaction steps occur between the numerical limits given. Typically however, practical considerations only allow for use of a portion of the designed coordination range. Accordingly, the aforesaid ranges are intended to be approximate as will be understood by those skilled in the art.

In a specific example of a set or series of compounds, to illustrate a system according to the invention, salts $MgBr_2$, $CoBr_2$, $CoCl_2$, $CaBr_2$ and $SrBr_2$ are used in a heat pump consisting of two separate reaction vessels. The compounds comprise the ammonia ligand complex compound of the aforesaid salts with the $MgBr_2$, $CoBr_2$, $CoCl_2$ and $CaBr_2$ salts forming complexes containing 2 to 6 $NH_3$ and $SrBr_2$ containing 2 to 8 $NH_3$. FIG. 1 illustrates schematically an example of an apparatus embodiment for carrying out the continuous constant pressure staged heat pump with the compounds designated A-E respectively in the order given above beginning with $MgBr_2 \cdot x$ $(NH_3)$. The salts are charged to reactors 10 and 20, in successive ascending order of the complex compound ligand vapor pressure. Thus, the set of salts in each reactor is aligned as shown successively A-E. In each reactor, there is provided a conduit or equivalent means for supplying a heat transfer fluid to thermally contact the compounds. The compounds may be present in a column in the order as shown, with the transfer fluid supply means comprising a pipe and having suitable means for example, fins to exchange heat with the compounds. The apparatus includes a burner or furnace 15 with conduits 26, 28, 38 and 42 which direct the heat transfer fluid between furnace 15, reactors 10 and 20, and heat exchanger 25. A valve 22 and pump 18 provide means to assist in directing the heat transfer fluid through the system. Evaporator 30 and condenser 32 are also connected with the reactors via pipes 36, 37, 38 and 39 and valve 35 for directing ammonia vapor to the condenser from the reactors and from the evaporator to the reactors. Valve 35 may also comprise a pair of check valves.

In a first reaction phase or half-cycle, valve 22 is positioned such that hot heat transfer fluid is directed via conduit 26 and into reactor 10. With the compounds arranged according to their ascending order of vapor pressure the heat transfer fluid will successively thermally communicate with the compounds in the set as it travels along the length of reactor 10.

In this reaction cycle, reactor 10 is the desorption reactor while reactor 20 is the adsorption reactor. Reactor 10 is pressurized to a first pressure, while reactor 20 is pressurized to a second pressure, lower than the first pressure. The desorption reactions in reactor 10 are driven by the heated heat transfer fluid introduced into the reactor via pipe 26 thereby driving these desorption reactions, successively, whereby the heat transfer fluid is gradually cooled as it gives up heat to the desorbing compounds. The cooled heat transfer fluid is then directed via conduit 28 through heat exchanger 25 where it is further cooled to a temperature suitable for introduction into reactor 20 via conduit 29. Reactor 20, in this phase or half-cycle of the process, is the adsorbing reactor in which the set of compounds therein adsorb the gaseous reactant in exothermic reactions. In this reactor, the heat transfer fluid is gradually heated as it is directed along the reactor and is successively exposed thermally to the exothermic adsorption reactions at successively higher temperatures. Thus, as the heat transfer fluid leaves reactor 20 via pipe 42, it is heated substantially relative to the temperature at which it was introduced via pipe 29. The heat transfer fluid is then directed back to furnace 15 where it is again heated to the temperature necessary for driving the endothermic reactions in reactor 10.

During this cycle of the process, the gaseous reactant from the desorption reactor 10 is directed to the condenser 32, and gaseous reactant for the adsorption reactions in reactor 20 is obtained from evaporator 30. The evaporator and condenser are in thermal contact with heat exchangers, not shown for transferring and recovering energy to and from the gaseous reactant.

In the second half-cycle or phase of the process, the pressure in the reactors is reversed such that reactor 20 becomes the desorbing reactor with reactor 10 being the adsorption reactor. Valve 22 is adjusted so that the heated heat transfer fluid is directed initially via pipe 42 to reactor 20, with the reactions then occurring as previously described in the first reaction phase but with the reactors reversed for adsorption and desorption. At the conclusion of the second half-cycle, the valves are again reversed and the first half-cycle as above described repeated.

The specific example of the aforesaid set of ammoniated complex compounds and typical adsorption and desorption reaction temperatures and pressures are further illustrated and described in the aforesaid incorporated copending application. Although the apparatus illustrated shows only two reactors, it is understood that a plurality of two or more reactors may be used, and hereinafter the term reactor or reactor(s) is intended to include one or a plurality of reactors. The aforesaid specific complex compounds may be used in a heat activated heat pump system incorporating an evaporator and condenser in which the gaseous reactant goes through a gas/liquid phase change, or used in a system in which reactors for adsorbing (absorbing) and desorbing the gaseous reactant replace the evaporator and condenser, as disclosed in the aforesaid copending application and incorporated herein by reference. These specific and preferred complex compounds may also be used in mechanical or pressure driven heat pump systems as also described and illustrated in the aforesaid copending application which description is also incorporated herein by reference.

VAPOR RECUPERATOR

According to the invention, an increase in the coefficient of performance (COP) and specific refrigeration capacity is provided by a vapor recuperator, comprising a heat exchanger located along the flow paths of the gaseous reactant to and from the reactor(s). As illustrated in FIG. 1, the vapor recuperator 40 is placed conveniently along the conduits 38 and 39 between reactors 10 and 20 and the evaporator 30 and condenser 32, respectively. At such a location, the recuperator 40 provides for heat exchange between the gaseous reactant vapor streams flowing between the reactor(s) and the condenser, and between the evaporator and the reactor(s). The recuperator may be located on either side of the valve 35, although where check valves are used, the position illustrated is preferred. By incorporating such a recuperator, super-heated vapor flowing from the desorption reactor(s) toward the condenser is cooled against the relatively cool vapor directed from the evaporator to the adsorption reactor(s). Because energy recuperated from the superheated refrigerant leaving the desorption reaction is transferred to the cold gaseous refrigerant typically leaving the evaporator and then undergoing exothermic adsorption, thermal efficiency of the system is increased.

Figure 2:
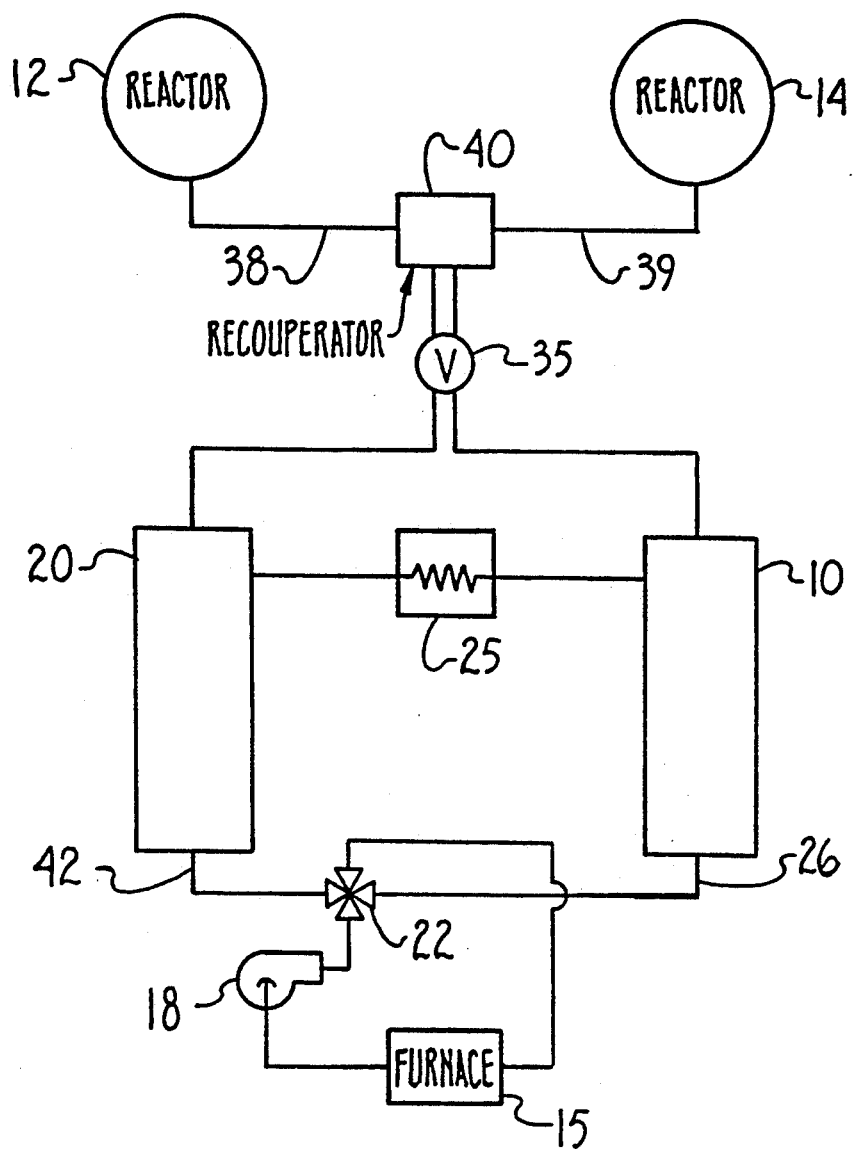

In the embodiment shown in FIG. 2, reactors 12 and 14 are substituted for the evaporator and condenser components used in the refrigerant phase charge apparatus of FIG. 1. Such reactors, contain a solid or liquid salts for alternately adsorbing (absorbing) and desorbing the gaseous reactant directed thereto from the staging reactors 10 and 20. The reactors 12 and 14 cooperate with heat exchanges for recovery of energy from the alternating chemisorption reaction as described in the aforesaid application and incorporated herein by reference. The vapor recuperator 40 functions the same way in this embodiment as in FIG. 1, to cool super-heated refrigerant vapor directed from a staging desorbing reactor (10 and 20) to an adsorbing reactor (12 or 14), against the relatively cool vapor directed from a desorbing reactor (12 or 14) to a staging adsorbing reactor (10 or 20).

LIQUID SUBCOOLER

Figure 3:
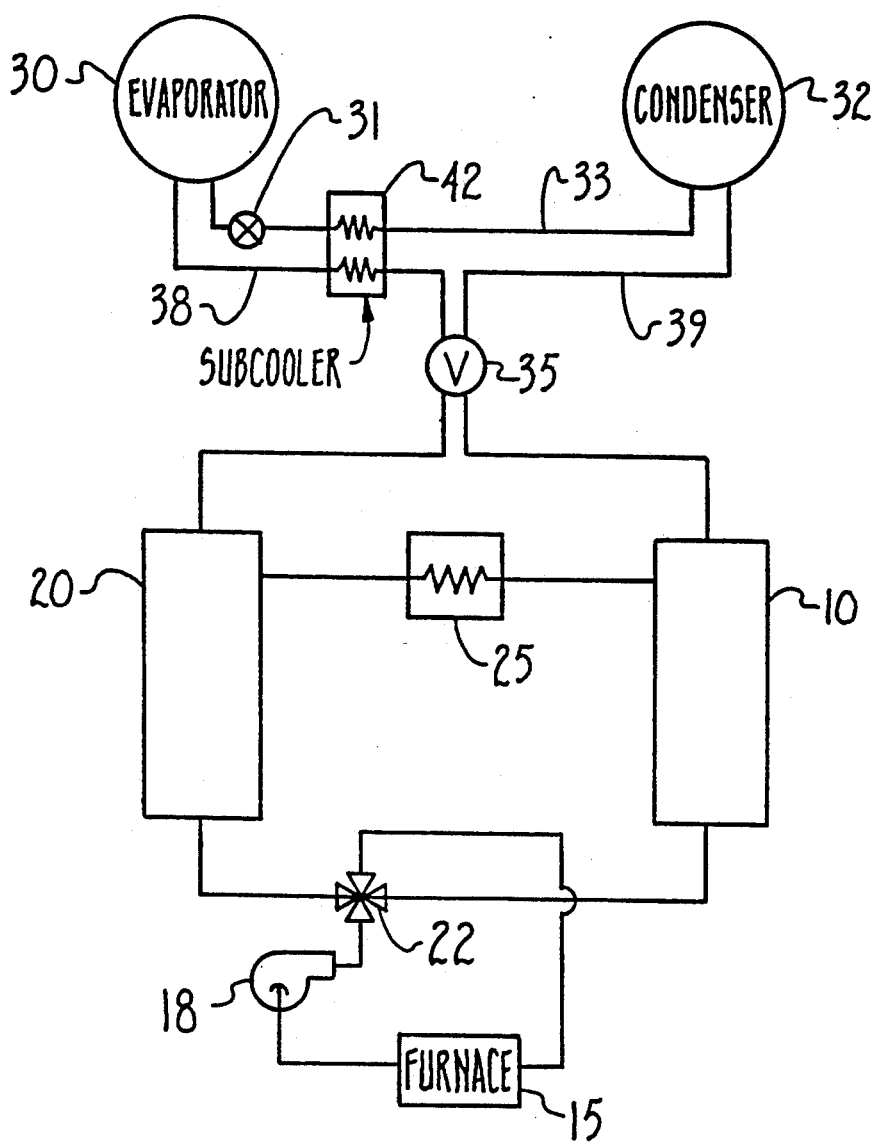
FIG. 3 is a schematic illustration of an apparatus of the invention incorporating a liquid subcooler.

In another embodiment of the invention, a liquid subcooler is used in a refrigerant phase change apparatus incorporating an evaporator and condenser. As illustrated in FIG. 3, a liquid subcooler 42 comprising a liquid-vapor heat exchanger is provided for cooling liquid gaseous reactant flowing from the condenser to expansion valve 31 via conduit 33 against relatively cold vapor of the gaseous reactant exiting the evaporator 30. The liquid subcooler 42 is conveniently located along the conduits 33 between the condenser 32 and evaporator 30 on the condenser side of expansion valve 31, or other gas expansion means, and conduit 38, whereby these fluid streams are in thermal communication to provide for heat may be transfer therebetween. This heat transfer causes the liquid gaseous reactant in conduit 33 to become subcooled by the heat exchange against the relatively cold vapor from the evaporator in conduit 38 whereby a smaller fraction of the liquid will flash to vapor in isenthalpic expansion thereby increasing the cooling efficiency and capacity of the system based on the amount of refrigerant fluid directed through the system. A further advantage of the subcooler is increasing the energy provided in the vapor stream from the evaporator to the adsorbing reactor thereby ultimately decreasing the amount of prime energy needed to drive desorption reactions. Accordingly, refrigeration capacity and COP are both increased.

Figure 4:
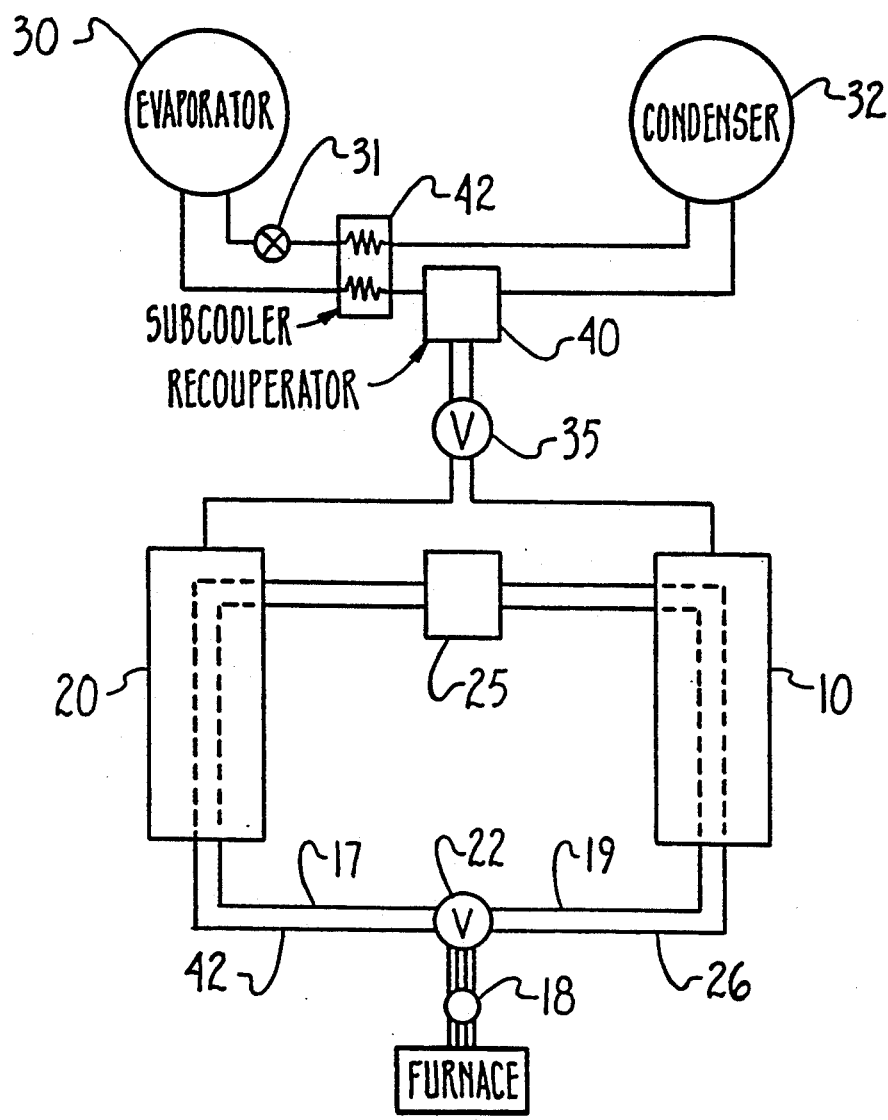
FIG. 4 is a schematic illustration of the same apparatus on the invention incorporating both a vapor recuperator and sub cooler.

In FIG. 4, an example of an apparatus incorporating both the vapor recuperator 40 and liquid subcooler 42 is illustrated.

FIG. 4 also illustrates an embodiment using multiple-circuits for directing heat transfer fluids to and from the salts in the reactors with the heat transfer fluids passing through the reactors is illustrated. For each of the reactors 10 and 20 there are illustrated two heat transfer circuits, conduits 19 and 26 for directing fluids to, from and through reactor 10, and circuits 17 and 42 for reactor 20. The use of multiple circuits in the reactors provides for the use of different heat transfer fluids and different phases of those fluids. For example, a reactor might be direct fired with flue gas or exhaust from furnace 15 during the desorption phase, and a different fluid or other heat transfer liquid used for rejecting or removing the heat during the adsorption phase. Although only two circuits are illustrated, the number of circuits is not to be limited. A plurality of different heat transfer fluids may be used in different circuits to maintain heat transfer over the temperature of the heat exchange required in the staging of the reactors and compounds. The use of specific and different heat transfer fluids may be tailored to the system, depending on a different combination of salts and the temperature ranges achieved in the reaction phases. The heat transfer fluids may be chosen to take optimum advantage of their respective heat transfer properties when used in such systems. Such multiple circuits may also be used to take advantage of using high temperature exhaust gases from furnace 15 or from outside waste or reject heat sources by directing such heated fluids through the reactors. These as well as other advantages within the scope of the invention will be evident to those skilled in the art.

We claim:
1. An apparatus comprising:
a plurality of two or more reactors, each reactor containing a plurality of two or more different compounds comprising a solid reactant adsorbent and a gaseous reactant adsorbed thereon, each of said compounds having a different gaseous reactant vapor pressure, substantially independent of the concentration of the gaseous reactant therein, said compounds arranged in ascending order of gaseous reactant vapor pressure,
means for supplying a heat transfer fluid to and from said reactors, and means for directing the heat transfer fluid through said reactors in successive thermal communication with said compounds therein, a condenser for condensing gaseous reactant desorbed from said compounds, and first means for directing said gaseous reactant from said reactors to said condenser, an evaporator for said gaseous reactant, and second means for directing said gaseous reactant from said evaporator to said reactors, a first heat exchanger cooperating with said first means and said second means for transferring heat therebetween, third means for directing condensed gaseous reactant from said condenser to said evaporator, and a second heat exchanger cooperating with said second means and said third means for transferring heat therebetween.

2. An apparatus of claim 1 wherein said means for directing heat transfer fluid through said reactors comprises multiple channel means capable of directing different heat transfer fluids therethrough in thermal communication with said compounds during adsorption and desorption reactions in said reactors.

3. Apparatus of claim 1 wherein said solid reactant is selected from the group consisting of a metal oxide, halide, carbonate, nitrate, nitrite, sulfate, oxalate, or sulfide, and wherein the metal is selected from the group consisting of alkali metal, alkaline earth metal, transition metal, aluminum, zinc, cadmium, and tin.

4. Apparatus of claim 1 wherein said solid reactant comprises a double metal chloride, said metals selected from the group consisting of an alkali metal, alkaline earth metal, aluminum, manganese, iron, nickel and cobalt.

5. Apparatus of claim 1 wherein said gaseous reactant is selected from the group consisting of ammonia, water, carbon dioxide, sulfur dioxide, lower alkanol, alkylamine, polyamine and phosphine.

6. Apparatus of claim 5 wherein said solid reactant is selected from the group consisting of a metal oxide, halide, carbonate, nitrate, nitrite, sulfate, oxalate, or sulfide, and wherein the metal is selected from the group consisting of alkali metal, alkaline earth metal, transition metal, aluminum, zinc, cadmium, and tin.

7. Apparatus of claim 5 wherein said solid reactant comprises a double metal chloride, said metals selected from the group consisting of an alkali metal, alkaline earth metal, aluminum, manganese, iron, nickel and cobalt.

8. Apparatus of claim 1 wherein said compounds are selected from the group consisting of:
$Ba\ Cl_2 \cdot 0\text{-}8\ (NH_3)$, $Sr\ Cl_2 \cdot 1\text{-}8\ (NH_3)$, $Sr\ Br_2 \cdot 2\text{-}8\ (NH_3)$,
$Ca\ Cl_2 \cdot 0\text{-}1\ (NH_3)$, $Ca\ Cl_2 \cdot 1\text{-}2\ (NH_3)$, $Ca\ Cl_2 \cdot 2\text{-}2\ (NH_3)$,
$Ca\ Cl_2 \cdot 4\text{-}8\ (NH_3)$, $Ca\ Br_2 \cdot 2\text{-}6\ (NH_3)$, $Ni\ Cl_2 \cdot 2\text{-}6\ (NH_3)$,
$Fe\ Cl_2 \cdot 2\text{-}6\ (NH_3)$, $Fe\ Br_2 \cdot 2\text{-}6\ (NH_3)$,
$Co\ Cl_2 \cdot 2\text{-}6\ (NH_3)$, $Co\ Br_2 \cdot 2\text{-}6\ (NH_3)$,
$Mg\ Cl_2 \cdot 2\text{-}6\ (NH_3)$, $Mg\ Br_2 \cdot 2\text{-}6\ (NH_3)$,
$Mn\ Cl_2 \cdot 2\text{-}6\ (NH_3)$, $Mn\ Br_2 \cdot 2\text{-}6\ (NH_3)$,
$Cu\ SO_2 \cdot 2\text{-}5\ (NH_3)$, $Zn\ Cl_2 \cdot 1\text{-}4\ (NH_3)$, and
$Na\ BF_4 \cdot 0.5\text{-}2.5\ (NH_3)$.

* * * * *